(12) United States Patent
Liu et al.

(10) Patent No.: US 12,021,409 B2
(45) Date of Patent: Jun. 25, 2024

(54) PHOTOVOLTAIC ELECTRIC APPLIANCE AND CHARGING CONTROL METHOD, DEVICE AND CIRCUIT THEREOF, AND STORAGE MEDIUM

(71) Applicant: Gree Electric Appliances, Inc. of Zhuhai, Guangdong (CN)

(72) Inventors: Han Liu, Guangdong (CN); Ningning Chen, Guangdong (CN); Xuefen Zhang, Guangdong (CN); Keqin Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 603 days.

(21) Appl. No.: 17/288,027

(22) PCT Filed: Aug. 15, 2019

(86) PCT No.: PCT/CN2019/100798
§ 371 (c)(1),
(2) Date: Apr. 23, 2021

(87) PCT Pub. No.: WO2020/082860
PCT Pub. Date: Apr. 30, 2020

(65) Prior Publication Data
US 2021/0399573 A1 Dec. 23, 2021

(30) Foreign Application Priority Data
Oct. 24, 2018 (CN) .......................... 201811240912.0

(51) Int. Cl.
*H02J 7/00* (2006.01)
*H02J 7/34* (2006.01)
*H02J 7/35* (2006.01)

(52) U.S. Cl.
CPC .............. *H02J 7/35* (2013.01); *H02J 7/0029* (2013.01); *H02J 7/0047* (2013.01);
(Continued)

(58) Field of Classification Search
CPC .......... H02J 7/35; H02J 7/0029; H02J 7/0047; H02J 7/00712; H02J 7/345; H02J 2207/50; H02J 3/34; H02J 7/007; Y02E 10/56
See application file for complete search history.

(56) References Cited

U.S. PATENT DOCUMENTS 9,812,869 B2 * 11/2017 Narla ...................... H02S 40/38
2009/0316323 A1 * 12/2009 Knopf .................. H01H 47/226
361/156

(Continued)

FOREIGN PATENT DOCUMENTS

CN 102565691 A 7/2012
CN 104167737 A 11/2014
(Continued)

*Primary Examiner* — Nghia M Doan
(74) *Attorney, Agent, or Firm* — The Webb Law Firm

(57) ABSTRACT

Disclosed are a photovoltaic electric appliance and a charging control method, device and circuit thereof, and a storage medium. The charging control circuit includes: a double-relay circuit and a charging relay circuit, wherein the double-relay circuit is arranged between a grid side circuit and a machine side circuit of the photovoltaic electric appliance; and the charging relay circuit is configured to turn on to realize the gradual charging of a bus capacitor when the double-relay circuit is not turned on. A charging relay circuit is added to an alternating-current power supply side, so that when double relays are not closed, a charging relay can be closed to realize the gradual charging of a bus capacitor.

17 Claims, 5 Drawing Sheets

(52) U.S. Cl.
CPC .......... *H02J 7/00712* (2020.01); *H02J 7/345* (2013.01); *H02J 2207/50* (2020.01)

(56) References Cited

U.S. PATENT DOCUMENTS

| | | | |
|---|---|---|---|
| 2015/0221799 A1* | 8/2015 | Hawthorn | H01L 31/02021 136/248 |
| 2016/0118846 A1* | 4/2016 | Huang | H02S 50/00 320/101 |
| 2018/0248513 A1 | 8/2018 | Höft | |
| 2018/0294660 A1 | 10/2018 | Byun | |
| 2021/0066922 A1* | 3/2021 | Boyer | H02J 3/381 |

FOREIGN PATENT DOCUMENTS

| | | |
|---|---|---|
| CN | 104300777 A | 1/2015 |
| CN | 104682432 A | 6/2015 |
| CN | 205693379 U | 11/2016 |
| CN | 107919655 A | 4/2018 |
| CN | 107957546 A | 4/2018 |
| CN | 109103979 A | 12/2018 |
| CN | 209072140 U | 7/2019 |
| WO | 2016000500 A1 | 1/2016 |
| WO | 2018171785 A1 | 9/2018 |

\* cited by examiner

US 12,021,409 B2

PHOTOVOLTAIC ELECTRIC APPLIANCE AND CHARGING CONTROL METHOD, DEVICE AND CIRCUIT THEREOF, AND STORAGE MEDIUM

CROSS-REFERENCE TO RELATED APPLICATIONS

The present application is a National Stage of International Application No. PCT/CN2019/100798 filed on Aug. 15, 2019, which claims the priority of the Chinese patent application No. 201811240912.0, entitled "Photovoltaic electric appliance and charging control method, device and circuit thereof, and storage medium" and filed on Oct. 24, 2018, both of which are incorporated herein by reference in their entireties.

BACKGROUND OF THE INVENTION

Field of the Invention

The present disclosure relates to the field of photovoltaic electric appliance, and in particular to a photovoltaic electric appliance and a charging control method, device and circuit thereof, and a storage medium.

Description of Related Art

For photovoltaic grid-connected AC (alternating current)-DC (direct current) converters, the photovoltaic and AC grids should be electrically isolated therebetween according to the requirements of the safety regulations, so that there is an AC relay therebetween. In addition, according to the requirements of IEC62109-2 (requirements for inverters in safety of a power conversion device for a photovoltaic power generation system) for the redundant structure of the relay, the photovoltaic converter that conforms to the certification requirements generally has a dual relay structure.

SUMMARY OF THE INVENTION

According to one aspect of the present disclosure, a charging control circuit is provided. The charging control circuit comprises a dual relay circuit and a charging relay circuit, wherein, the dual relay circuit is arranged between a grid side circuit and a machine side circuit of a photovoltaic electric appliance; and the charging relay circuit is provided to be turned on to realize gradual charging of a bus capacitance in the case where the dual relay circuit is not turned on.

In some embodiments of the present disclosure, the charging relay circuit comprises a charging relay and a charging resistor.

In some embodiments of the present disclosure, the charging relay circuit is connected across both ends of the dual relay circuit.

In some embodiments of the present disclosure, one end of the charging relay circuit is connected to a connection point between the grid side circuit and the dual relay circuit, and the other end of the charging relay circuit is connected to a direct current bus.

In some embodiments of the present disclosure, the dual relay circuit comprises: a first relay and a second relay connected in series to a neutral wire; and a third relay and a fourth relay connected in series to a live wire.

In some embodiments of the present disclosure, the first relay, the second relay, the third relay, and the fourth relay are four separate AC relays.

In some embodiments of the present disclosure, the dual relay circuit comprises: a first group of dual switch relays comprising the first relay and the third relay; and a second group of switch relays comprising the second relay and the fourth relay.

In some embodiments of the present disclosure, the charging control circuit further comprises a first voltage detection device, a second voltage detection device, and a charging control device, wherein, the first voltage detection device is configured to detect a grid side voltage at a connection point between the grid side circuit and the dual relay circuit of the photovoltaic electric appliance; the second voltage detection device is configured to detect a machine side voltage at a connection point between the machine side circuit and the dual relay circuit of the photovoltaic electric appliance; and the charging control device is configured to perform at least one of the following steps: controlling on and off of the charging relay circuit and the dual relay circuit according to the grid side voltage and the machine side voltage, and determining a circuit failure type according to the grid side voltage and the machine side voltage.

In some embodiments of the present disclosure, the charging control circuit further comprises a first voltage detection device, a second voltage detection device, and a charging control device, wherein, the first voltage detection device is configured to detect a grid side voltage at a connection point between the grid side circuit and the dual relay circuit of the photovoltaic electric appliance; the second voltage detection device is configured to detect a machine side voltage at a connection point between the machine side circuit and the dual relay circuit of the photovoltaic electric appliance; and the charging control device is configured to control on and off of the charging relay circuit and the dual relay circuit according to the grid side voltage and the machine side voltage.

In some embodiments of the present disclosure, the charging control circuit further comprises a first voltage detection device, a second voltage detection device, and a charging control device, wherein, the first voltage detection device is configured to detect a grid side voltage at a connection point between the grid side circuit and the dual relay circuit of the photovoltaic electric appliance; the second voltage detection device is configured to detect a machine side voltage at a connection point between the machine side circuit and the dual relay circuit of the photovoltaic electric appliance; and the charging control device is configured to determine a circuit failure type according to the grid side voltage and the machine side voltage.

In some embodiments of the present disclosure, the charging control circuit further comprises a first voltage detection device, a second voltage detection device, and a charging control device, wherein the first voltage detection device is configured to detect a grid side voltage at a connection point between the grid side circuit and the dual relay circuit of the photovoltaic electric appliance; the second voltage detection device is configured to detect a machine side voltage at a connection point between the machine side circuit and the dual relay circuit of the photovoltaic electric appliance; and the charging control device is configured to control on and off of the charging relay circuit and the dual relay circuit according to the grid side voltage and the machine side voltage, and determine a circuit fault type according to the grid side voltage and the machine side voltage.

In some embodiments of the present disclosure, the charging control circuit further comprises a third voltage detection device, wherein the third voltage detection device is configured to detect a direct current bus voltage; and the charging control device is configured to perform at least one of the following steps: controlling on and off of the charging relay circuit and the dual relay circuit according to the direct current bus voltage, the grid side voltage and the machine side voltage, and determining a circuit fault type according to the direct current bus voltage, the grid side voltage and the machine side voltage.

In some embodiments of the present disclosure, the charging control circuit further comprises a third voltage detection device, wherein the third voltage detection device is configured to detect a direct current bus voltage; and the charging control device is configured to control on and off of the charging relay circuit and the dual relay circuit according to the direct current bus voltage, the grid side voltage and the machine side voltage.

In some embodiments of the present disclosure, the charging control circuit further comprises a third voltage detection device, wherein the third voltage detection device is configured to detect a direct current bus voltage; the charging control device is configured to determine a circuit fault type according to the direct current bus voltage, the grid side voltage and the machine side voltage.

In some embodiments of the present disclosure, the charging control circuit further comprises a third voltage detection device, wherein the third voltage detection device is configured to detect the direct current bus voltage; the charging control device is configured to control on and off of the charging relay circuit and the dual relay circuit according to the direct current bus voltage, the grid side voltage and the machine side voltage, and determine a circuit fault type according to the direct current bus voltage, the grid side voltage and the machine side voltage.

According to another aspect of the present disclosure, a charging control method is provided. The method comprises the steps of: determining whether a dual relay circuit in the charging control circuit according to any one of the above-described embodiments is turned on; turning on the charging relay circuit to realize gradual charging of the bus capacitor in the case where the dual relay circuit is not turned on.

In some embodiments of the present disclosure, the charging control method further comprises: obtaining a grid side voltage and a machine side voltage; and controlling on and off of the charging relay circuit and the dual relay circuit according to the grid side voltage and the machine side voltage.

In some embodiments of the present disclosure, the charging control method further comprises: obtaining a grid side voltage and a machine side voltage; and determining a circuit fault type according to the grid side voltage and the machine side voltage.

In some embodiments of the present disclosure, the charging control method further comprises: obtaining a grid side voltage and a machine side voltage; controlling on and off of the charging relay circuit and the dual relay circuit according to the grid side voltage and the machine side voltage, and determining a circuit fault type according to the grid side voltage and the machine side voltage.

In some embodiments of the present disclosure, the step of controlling on and off of the charging relay circuit and the dual relay circuit according to the grid side voltage and the machine side voltage comprises: obtaining a direct current bus voltage; and controlling on and off of the charging relay circuit and the dual relay circuit according to the direct current bus voltage, the grid side voltage and the machine side voltage.

In some embodiments of the present disclosure, the step of determining a circuit fault type according to the grid side voltage and the machine side voltage: obtaining a direct current bus voltage; and determining a circuit fault type according to the direct current bus voltage, the grid side voltage and the machine side voltage.

In some embodiments of the present disclosure, the step of controlling on and off of the charging relay circuit and the dual relay circuit according to the grid side voltage and the machine side voltage, and determining a circuit fault type according to the grid side voltage and the machine side voltage comprises: obtaining a direct current bus voltage; controlling on and off of the charging relay circuit and the dual relay circuit according to the direct current bus voltage, the grid side voltage and the machine side voltage, and determining a circuit fault type according to the direct current bus voltage, the grid side voltage and the machine side voltage.

In some embodiments of the present disclosure, the charging relay circuit comprises a charging relay, and the step of controlling on and off of the charging relay circuit and the dual relay circuit according to the direct current bus voltage, the grid side voltage and the machine side voltage, and determining a circuit fault type according to the direct current bus voltage, the grid side voltage and the machine side voltage comprises: determining whether an effective value of the grid side voltage and an effective value of the machine side voltage satisfy a first condition that the effective value of the grid side voltage is within a first predetermined range, and the effective value of the machine side voltage is less than a predetermined value; turning on the charging relay in the case where the effective value of the grid side voltage and the effective value of the machine side voltage satisfy the first condition; and determining a relay failure, and reporting a message of a relay failure to the outside in the case that the effective value of the grid side voltage and the effective value of the machine side voltage do not satisfy a first condition, wherein the message of a relay failure is that the first relay to the fourth relay of the dual relay circuit are all short-circuited.

In some embodiments of the present disclosure, the step of determining a circuit fault type according to the direct current bus voltage, the grid side voltage and the machine side voltage further comprises: determining whether the direct current bus voltage satisfies a second condition within a first predetermined time interval after turning on the charging relay, wherein the second condition is that the direct current bus voltage is greater than a predetermined voltage; and determining short-circuit of the direct current bus, and reporting a message of short-circuit of the direct current bus to the outside in the case where the direct current bus voltage does not satisfy a second condition within the first predetermined time interval after turning on the charging relay.

In some embodiments of the present disclosure, the step of determining a circuit fault type according to the direct current bus voltage, the grid side voltage and the machine side voltage further comprises: determining whether the direct current bus voltage satisfies a third condition after turning on the charging relay for the first predetermined time interval in the case where the direct current bus voltage satisfies a second condition within the first predetermined time interval after turning on the charging relay, wherein the third condition is that the direct current bus voltage is greater than a predetermined direct current bus threshold; and determining a charging circuit fault and reporting a message of a charging circuit fault to the outside in the case where the direct current bus voltage still does not satisfy a third condition after a second predetermined time interval.

In some embodiments of the present disclosure, the step of controlling on and off of the charging relay circuit and the dual relay circuit according to the direct current bus voltage, the grid side voltage and the machine side voltage, and determining a circuit fault type according to the direct current bus voltage, the grid side voltage and the machine side voltage further comprises: turning on any three of four relays of the dual relay circuit after delay of the third predetermined time interval in the case where the direct current bus voltage satisfies a third condition after the charging relay is turned on for the first predetermined time interval; disconnecting the charging relay after delay of the third predetermined time interval; determining whether the effective value of the machine side voltage satisfies a fourth condition after delay of the third predetermined time interval, wherein the fourth condition is that an effective value of the machine side voltage is less than a predetermined value; and determining a relay failure, and reporting a message of a relay failure to the outside if an effective value of the machine side voltage still does not satisfy a fourth condition after delay of a fourth predetermined time interval, wherein the relay failure is that a relay not selected among the four relays is short-circuited.

In some embodiments of the present disclosure, the step of controlling on and off of the charging relay circuit and the dual relay circuit according to the direct current bus voltage, the grid side voltage and the machine side voltage, and determining a circuit fault type according to the direct current bus voltage, the grid side voltage and the machine side voltage further comprises: disconnecting four of the relays, and turning on the charging relay after delay of the third predetermined time interval in the case that an effective value of the machine side voltage satisfies the fourth condition; determining whether the direct current bus voltage satisfies a fifth condition after delay of the third predetermined time interval, wherein the fifth condition is that the direct current bus voltage continues to be greater than the predetermined direct current bus threshold; determining a charging circuit fault, and reporting a message of the charging circuit fault to the outside in the case that the direct current bus voltage does not satisfy the fifth condition.

In some embodiments of the present disclosure, the step of controlling on and off of the charging relay circuit and the dual relay circuit according to the direct current bus voltage, the grid side voltage and the machine side voltage, and determining a circuit fault type according to the direct current bus voltage, the grid side voltage and the machine side voltage further comprises: turning on four of the relays and turning on the charging relay in the case where the direct current bus voltage satisfies the fifth condition; determining whether an effective value of the machine side voltage satisfies a sixth condition after delay of the third predetermined time interval, wherein the sixth condition is that an effective value of the machine side voltage is within a second predetermined range; determining that a charging control task is completed, and reporting a message that the charging control task is completed to the outside in the case that an effective value of the machine side voltage satisfies the sixth condition; determining that the relay fails, and reporting a message that the relay fails to the outside in the case that an effective value of the machine side voltage does not satisfy a sixth condition.

According to another aspect of the present disclosure, a charging control device is provided. The charging control device comprises: a determination unit configured to determine whether a dual relay circuit in the charging control circuit according to any one of the above-described embodiments is turned on; and a control unit configured to turn on a charging relay circuit to achieve gradual charging of a bus capacitor in the case where the dual relay circuit is not turned on.

In some embodiments of the present disclosure, the charging control device is configured to perform operations for implementing the charging control method according to any one of the above-described embodiments.

In some embodiments of the present disclosure, the charging control device is a charging control device in the charging control circuit according to any one of the above-described embodiments.

According to another aspect of the present disclosure, a charging control device is provided. The charging control device comprises: a memory configured to store instructions; and a processor configured to execute the instructions, so that the charging control device performs operations for implementing the charging control method according to any one of the above-described embodiments.

According to another aspect of the present disclosure, a photovoltaic electric appliance is provided. The photovoltaic electric appliance comprises the charge control circuit according to any one of the above-described embodiments, and/or comprises the charge control device according to any one of the above-described embodiments.

According to another aspect of the present disclosure, a photovoltaic electric appliance is provided. The photovoltaic electric appliance comprises the charging control device according to any one of the above-described embodiments.

According to another aspect of the present disclosure, a photovoltaic electric appliance is provided. The photovoltaic electric appliance comprises the charging control circuit according to any one of the above-described embodiments, and comprising the charging control device according to any one of the above-described embodiments.

According to another aspect of the present disclosure, a computer-readable storage medium is provided. Wherein the computer-readable storage medium stores computer instructions, and the charging control method according to any one of the above-described embodiments is implemented when the instructions are executed by a processor.

BRIEF DESCRIPTION OF THE DRAWINGS

The accompanying drawings of the specification that constitute a part of the present disclosure, are used to provide a further understanding of the present disclosure. The illustrative embodiments of the present disclosure as well as the descriptions thereof, which are provided for explaining the present disclosure, do not constitute improper definitions on the present disclosure. In the accompanying drawings.

DETAILED DESCRIPTION OF THE INVENTION

It should be noted that, in the case without a conflict, the embodiments in the present disclosure and the features in the embodiments may be combined with each other. The present disclosure will be described in detail below with reference to the accompanying drawings and in conjunction with the embodiments.

In order to allow those skilled in the art to better understand the solution of the present disclosure, the technical solution in the embodiments of the present disclosure will be explicitly and completely described below in combination with the accompanying drawings in the embodiments of the present disclosure. Apparently, the described embodiments are merely part of the embodiments of the present disclosure, rather than all the embodiments. On the basis of the embodiments of the present disclosure, all the other embodiments acquired by a person skilled in the art on the premise that no inventive effort is involved should fall into the scope protected by the present disclosure.

It should be noted that the terms "first", "second" and the like in the specification and claims of the present disclosure and the above-described accompanying drawings are used to distinguish similar objects, and are not necessarily used to describe a specific order or sequence. It is to be understood that the data thus used is interchangeable as appropriate, such that the embodiments of the present disclosure described here can be implemented, in a sequence other than those illustrated or described here. In addition, the terms "comprises" and "has" as well as any of their deformations are intended to cover a non-exclusive inclusion. For example, the process, method, system, product, or device that contains a series of steps or units is not necessarily limited to those steps or units that are explicitly listed, but may comprise other steps or units that are not explicitly listed or that are inherent to such processes, methods, products or devices.

It should be understood that when an element (such as a layer, film, area, or substrate) is described as being "on" another element, the element may be directly on the other element, or it is also possible that there is an element therebetween. Moreover, in the specification and claims, when it is described that there is an element "connected" to another element, the element may be "directly connected" to the another element, or "connected" to the another other element through a third element.

The dual relay structure is in the related technologies present with two problems: firstly, it is impossible to resolve the charging of the direct current bus capacitor; secondly, it is impossible to satisfy the failure detection for single fault of the relay in the IEC certification.

Figure 1:
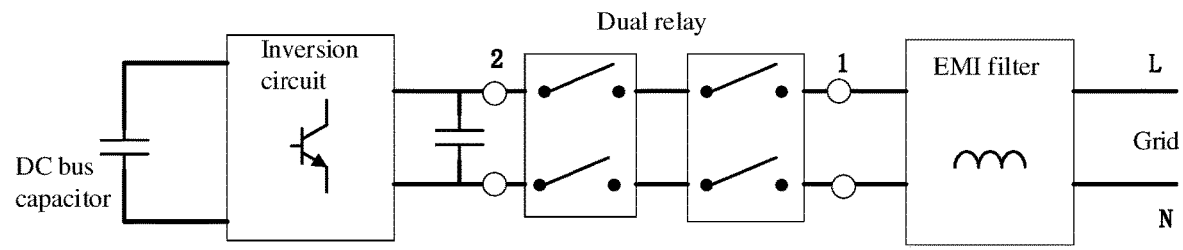
FIG. 1 is a schematic view of the dual relay structure of a photovoltaic grid-connected inverter in the related art of the present disclosure.

In the application of a photovoltaic grid-connected inverter in related technologies, a solution is provided such that whether each relay fails is accurately detected, and at the same time a capacitor voltage output by the inverter is processed to eliminate the possibility that the filter capacitor is subjected to a current impact from the grid at the moment when the inverter is connected to the grid. As shown in FIG. 1, in the related technologies, the above-described effect is achieved by the grid voltage detection at the point 1 #and the inverter voltage at the point 2 #combined with certain relay action strategies. It should be noted that in the photovoltaic grid-connected inverter, the charging of the bus capacitor is realized by a photovoltaic assembly. If there is no photovoltaic system, the direct current side is not live, so that the control circuit is not energized. Even if there the AC side is live, the relay may not be actuated.

Different from pure power generation devices such as a photovoltaic inverter, the photovoltaic air conditioner, as a device integrating power generation and power consumption, is required to not only realize photovoltaic grid-connected inversion when the photovoltaic energy is abundant, but also more importantly, to ensure normal operation of the outdoor unit of the air conditioner in the case of normal AC power supply. Based on the design concept of prioritizing power consumption, it is required that the outdoor unit of the air conditioner should operate normally even when there is no photovoltaic energy, so that it is impossible to use a photovoltaic inverter (by a photovoltaic assembly) to charge the direct current bus capacitor.

In view of the technical problem that the AC power supply side circuit in a circuit of the photovoltaic electric appliance cannot realize the charging control of the bus circuit in the related technologies, the present disclosure provides a photovoltaic electric appliance and a charging control method, device and circuit thereof, and a storage medium, wherein a charging circuit is added on the AC power supply side to realize the charging control of the bus capacitor.

Figure 2:
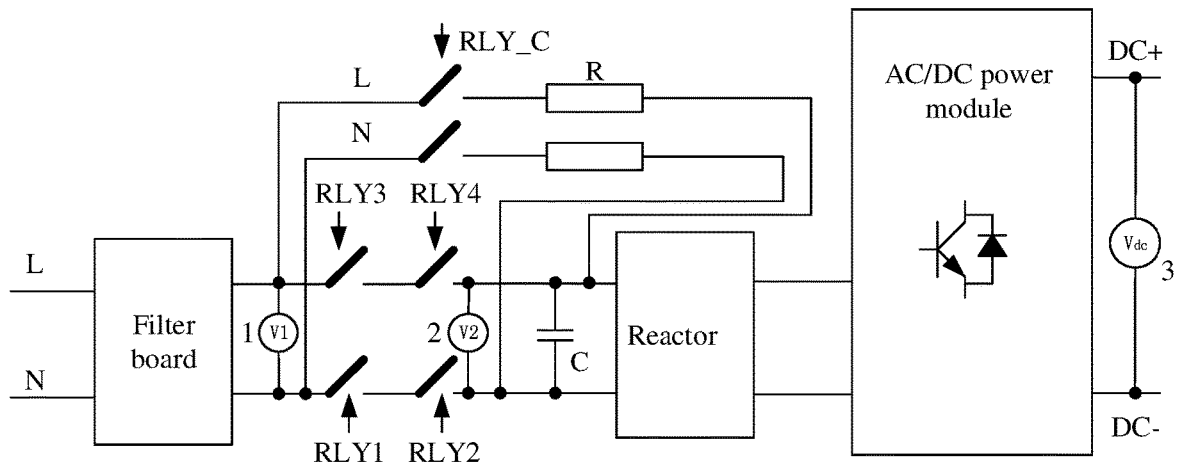
FIG. 2 is a schematic view of some embodiments of the charging control circuit of the present disclosure.

FIG. 2 is a schematic view of some embodiments of the charging control circuit of the present disclosure. As shown in FIG. 2, the above-described charging control circuit may comprise a dual relay circuit and a charging relay circuit, wherein:

The dual relay circuit is arranged between the grid side circuit and the machine side circuit of the photovoltaic electric appliance.

In some embodiments of the present disclosure, the above-described photovoltaic electrical device may be a photovoltaic air conditioner.

In some embodiments of the present disclosure, the above-described grid side circuit may be a circuit on the AC grid side.

In some embodiments of the present disclosure, as shown in FIG. 2, the above-described grid side circuit may comprise a filter board and an AC power supply.

In some embodiments of the present disclosure, the above-described machine side circuit may be a circuit on the photovoltaic electric appliance side and the photovoltaic side.

In some embodiments of the present disclosure, as shown in FIG. 2, the above-described machine side circuit may comprise a reactor, an AC/direct current power module, and a photovoltaic device.

In some embodiments of the present disclosure, as shown in FIG. 2, the above-described dual relay circuit may be arranged between the filter board of the grid side circuit and the reactor of the machine side circuit.

The charging relay circuit is configured to be turned on to realize gradual charging of the bus capacitor in the case where the dual relay circuit is not turned on.

In some embodiments of the present disclosure, as shown in FIG. 2, the above-described charging relay circuit may comprise a charging relay RLY_C and a charging resistor R.

In some embodiments of the present disclosure, as shown in FIG. 2, the above-described charging relay circuit is connected across both ends of the dual relay circuit.

In the present disclosure, a charging relay circuit is added on the AC power supply side, so that the charging relay may be turned on to realize gradual charging of the bus capacitor in the case where the dual relay is not turned on.

Figure 3:
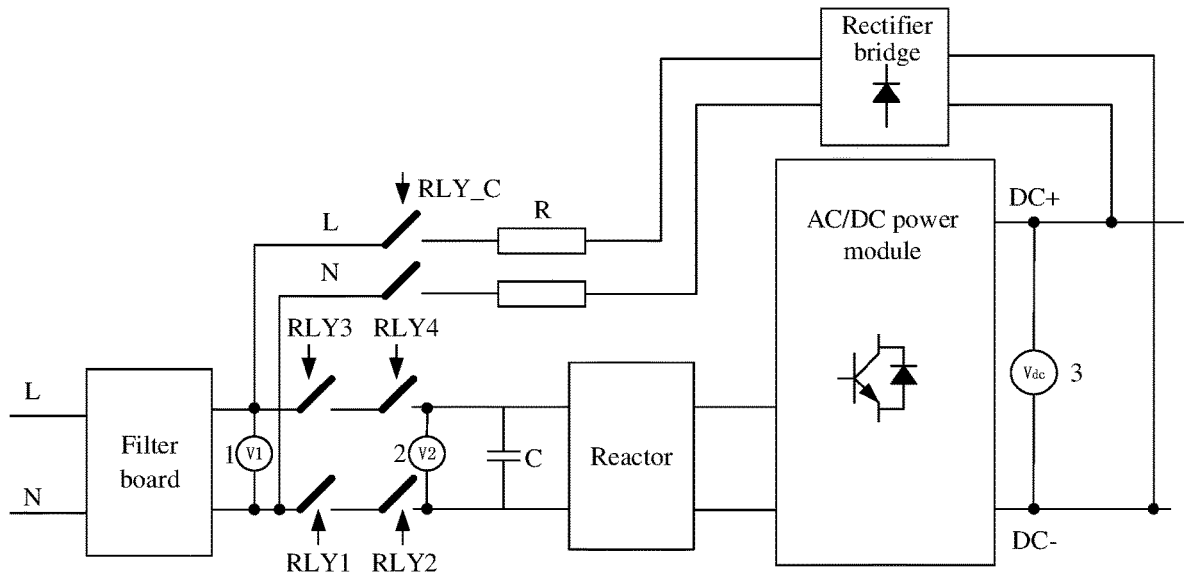
FIG. 3 is a schematic view of some other embodiments of the charging control circuit of the present disclosure.

FIG. 3 is a schematic view of some other embodiments of the charging control circuit of the present disclosure. As shown in FIG. 3, one end of the above-described charging relay circuit is connected to a connection point between the grid side circuit and the dual relay circuit, and the other end of the above-described charging relay circuit is connected to the direct current bus through a rectifier bridge.

In some embodiments of the present disclosure, as shown in FIGS. 2 and 3, the above-described dual relay circuit may comprise a first relay RLY1, a second relay RLY2, a third relay RLY3, and a fourth relay RLY4, wherein:

The first relay RLY1 and the second relay RLY2 are connected in series on the neutral wire N.

The third relay RLY3 and the fourth relay RLY4 are connected in series on the live wire L.

In some embodiments of the present disclosure, the above-described first relay RLY1, second relay RLY2, third relay RLY3, and fourth relay RLY4 are four separate AC relays.

In other embodiments of the present disclosure, the above-described dual relay circuit may comprise two groups of dual switch relays as shown in FIG. 1, wherein:

The first dual switch relay comprises a first relay RLY1 and a third relay RLY3.

The second dual switch relay comprises a second relay RLY2 and a fourth relay RLY4.

The dual switch relay of the above-described embodiments of the present disclosure is considered to be one device, and the dual switch relay may turn on and off the two relays through one signal at the same time. For example, RLY1 and RLY3 are in a group, and RLY2 and RLY4 are in a group. The above-described embodiments of the present disclosure may use two control signals to control two groups of relays.

In some embodiments of the present disclosure, as shown in FIGS. 2 and 3, the above-described charging control circuit may further comprise a first voltage detection device 1 and a second voltage detection device 2.

Figure 4:
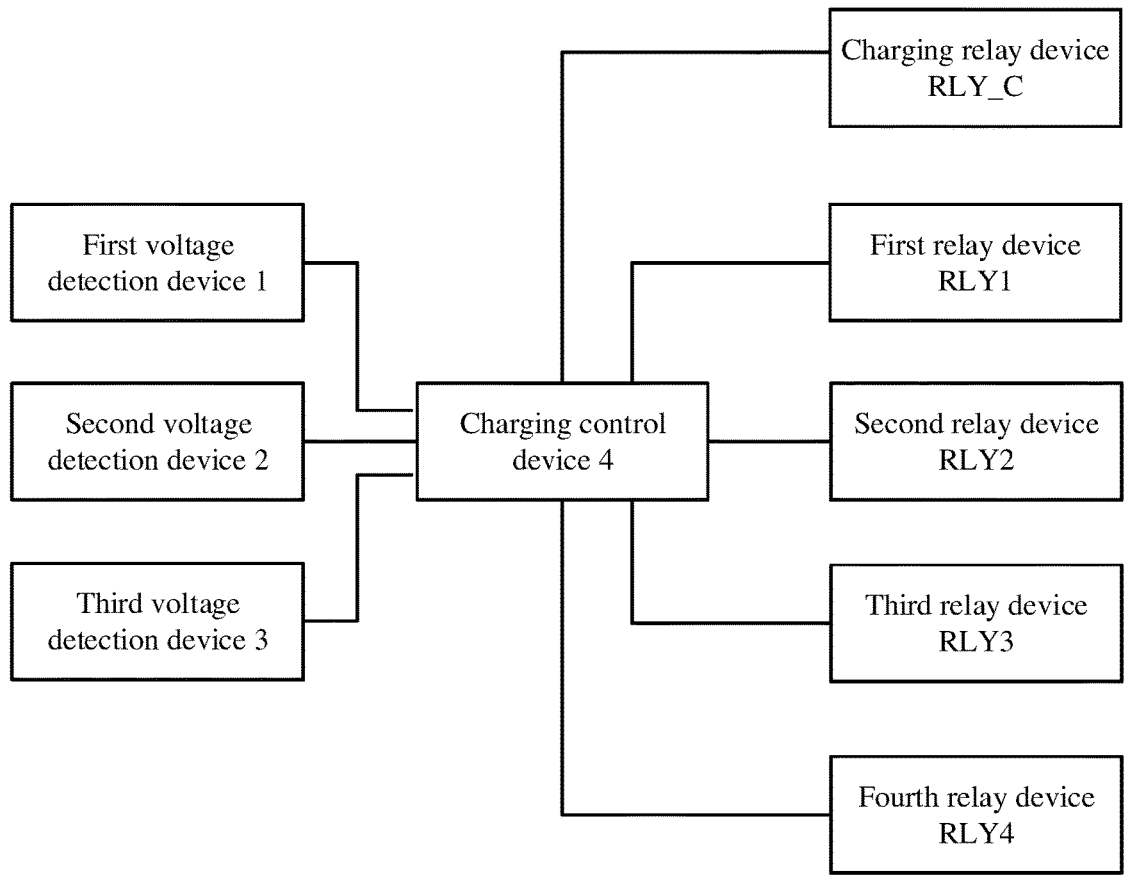
FIG. 4 is a schematic view of still some other embodiments of the charging control circuit of the present disclosure.

FIG. 4 is a schematic view of still some other embodiments of the charging control circuit of the present disclosure. As shown in FIG. 4, the charging control circuit of the embodiments of FIGS. 2 and 3 may further comprise a charging control device 4.

The first voltage detection device 1 and the second voltage detection device 2 are respectively connected to the charging control device 4.

The charging control device 4 is also connected to the charging relay RLY_C, the first relay RLY1, the second relay RLY2, the third relay RLY3, and the fourth relay RLY4 respectively.

The first voltage detection device 1 is configured to detect a grid side voltage V1 at a connection point between the grid side circuit and the dual relay circuit of the photovoltaic electric appliance.

The second voltage detection device 2 is configured to detect a machine side voltage V2 at a connection point between the machine side circuit and the dual relay circuit of the photovoltaic electric appliance.

The charging control device 4 is configured to control on and off of the charging relay RLY_C, the first relay RLY1, the second relay RLY2, the third relay RLY3 and the fourth relay RLY4 according to the grid side voltage and the machine side voltage; and/or determine a circuit fault type according to the grid side voltage and the machine side voltage.

In some embodiments of the present disclosure, the charging control device 4 may be configured to determine whether the dual relay circuit in the charging control circuit described in any one of the above-described embodiments is turned on; and in the case where the dual relay circuit is not turned on, the charging relay circuit is turned on to achieve gradual charging of the bus capacitance.

In some embodiments of the present disclosure, as shown in FIG. 2, FIG. 3, and FIG. 4, the above-described charging control circuit may further comprise a third voltage detection device 3.

The third voltage detection device 3 is configured to detect a direct current bus voltage Vdc.

In some embodiments of the present disclosure, the third voltage detection device 3 is arranged at a direct current side of direct current/AC. For a system containing a photovoltaic direct current, a direct current-direct current converter, a direct current contactor and a filter board are also provided between the third voltage detection device 3 and the photovoltaic cell. Even for a system not containing a photovoltaic direct current, a direct current contactor and a filter board are also provided between the third voltage detection device 3 and the photovoltaic cell. Only when the contactor is turned on, the third voltage detection device 3 and the photovoltaic cell are one potential point.

The charging control device 4 is configured to control on and off of the charging relay RLY_C, the first relay RLY1, the second relay RLY2, the third relay RLY3 and the fourth relay RLY4 according to the direct current bus voltage, the grid side voltage and the machine side voltage; and/or, determine a circuit fault type according to the direct current bus voltage, the grid side voltage and the machine side voltage.

Based on the charging control circuit provided by the above-described embodiments of the present disclosure, a charging circuit is added on the AC power supply side so that it is possible to realize the charging control of the bus capacitor. In the above-described embodiments of the present disclosure, the AC side charging relay (RLY_C) and the charging resistor are connected across both ends of the dual relay. In the case where the dual relay is not turned on, the charging relay may be turned on to achieve gradual charging of the bus capacitance. In the above-described embodiments of the present disclosure, it is also possible to realize the adhesion and open-circuit detection of the AC relay and the suppression of the impact on the filter capacitor on the basis of such circuit.

In some embodiments of the present disclosure, as shown in FIG. 2 and FIG. 3, the above-described charging control circuit may further comprise a filter capacitor C.

The filter capacitor C is arranged between the second voltage detection device 2 and the reactor.

For the charging control circuit of the embodiment in FIG. 2, due to the existence of the charging resistor, since such charging process of the filter capacitor from no charge to first charging (the charging relay is turned on to charge the bus capacitor) is realized by connecting the charging resistor and the charging relay to the power grid such that the charging resistor has a current limiting effect, the above-described embodiments of the present disclosure may suppress the impact on the filter capacitor C. However, the circuit structure of FIG. 3 cannot achieve such suppression effect.

In the above-described embodiments of the present disclosure, the charging control device 4 may realize fault detection such as adhesion and open-circuit detection of the AC relay, and suppress the impact on the filter capacitor by performing the charging control method of the present disclosure.

The following describes the charging control method of the present disclosure by way of specific embodiments.

Figure 5:
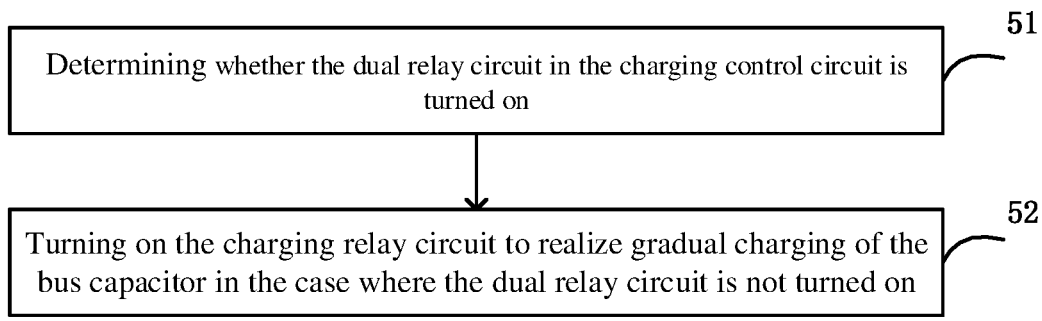
FIG. 5 is a schematic view of some embodiments of the charging control method of the present disclosure.

FIG. 5 is a schematic view of some embodiments of the charging control method of the present disclosure. Preferably, this embodiment may be performed by the charging control device of the present disclosure or the charging control circuit of the present disclosure. The method comprises step 51 and step 52.

In step 51, it is determined whether the dual relay circuit in the charging control circuit described in any one of the above-described embodiments is turned on.

In step 52, the charging relay circuit is turned on to realize gradual charging of the bus capacitor in the case where the dual relay circuit is not turned on.

For the charging control circuit of the embodiment in FIG. 2, due to the existence of the charging resistor, since such charging process of the filter capacitor from no charge to first charging (the charging relay is turned on to charge the bus capacitor) is realized by connecting the charging resistor and the charging relay to the power grid such that the charging resistor has a current limiting effect, the above-described embodiments of the present disclosure may suppress the impact on the filter capacitor C. However, the circuit structure of FIG. 3 cannot achieve such suppression effect.

Based on the charging control circuit provided by the above-described embodiments of the present disclosure, a charging circuit is added on the AC power supply side so that it is possible to realize the charging control of the bus capacitor. In the above-described embodiments of the present disclosure, the AC side charging relay (RLY_C) and the charging resistor are connected across both ends of the dual relay. In the case where the dual relay is not turned on, the charging relay may be turned on to achieve gradual charging of the bus capacitance.

Figure 6:
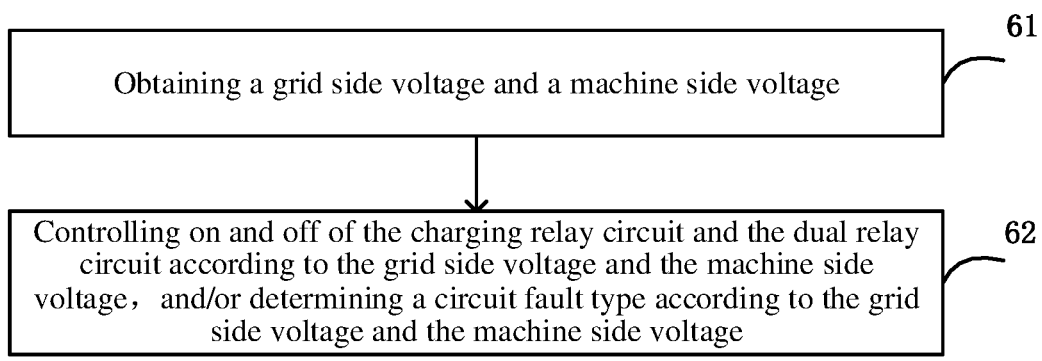
FIG. 6 is a schematic view of some other embodiments of the charging control method of the present disclosure.

FIG. 6 is a schematic view of some other embodiments of the charging control method of the present disclosure. Preferably, this embodiment may be performed by the charging control device of the present disclosure or the charging control circuit of the present disclosure. The method comprises step 61 and step 62.

In step 61, the grid side voltage and the machine side voltage are obtained.

In step 62, the on and off of the charging relay circuit and the dual relay circuit is controlled according to the grid side voltage and the machine side voltage, and/or a circuit fault type is determined according to the grid side voltage and the machine side voltage.

In some embodiments of the present disclosure, the step 62 may comprise step 621 and step 622.

In step 621, the direct current bus voltage Vdc is obtained.

In step 622, the on and off of the charging relay circuit and the dual relay circuit is controlled according to the direct current bus voltage, the grid side voltage and the machine side voltage, and/or a circuit fault type is determined according to the direct current bus voltage, the grid side voltage and the machine side voltage.

In some embodiments of the present disclosure, the above-described circuit fault type may comprise adhesion and open-circuit of the AC relay, and short-circuit of the direct current bus.

In some embodiments of the present disclosure, it is also possible to suppress the impact on the AC filter capacitor.

In the above-described embodiments of the present disclosure, if the bus is short-circuited due to some external reasons, the charging resistor continuously connected in such short-circuited condition may result in heating and damage of the charging resistor. Therefore, it is necessary to check short-circuit of the direct current bus so as to avoid that the charging resistor is connected for a long time.

In the above-described embodiments of the present disclosure, a charging and dual relay circuit applied to the photovoltaic electrical device is provided, so that it is possible to achieve the effects such as detection of adhesion and open-circuit of the AC relay, and short-circuit of the direct current bus, and suppression of the impact on the AC filter capacitor.

Figure 7:
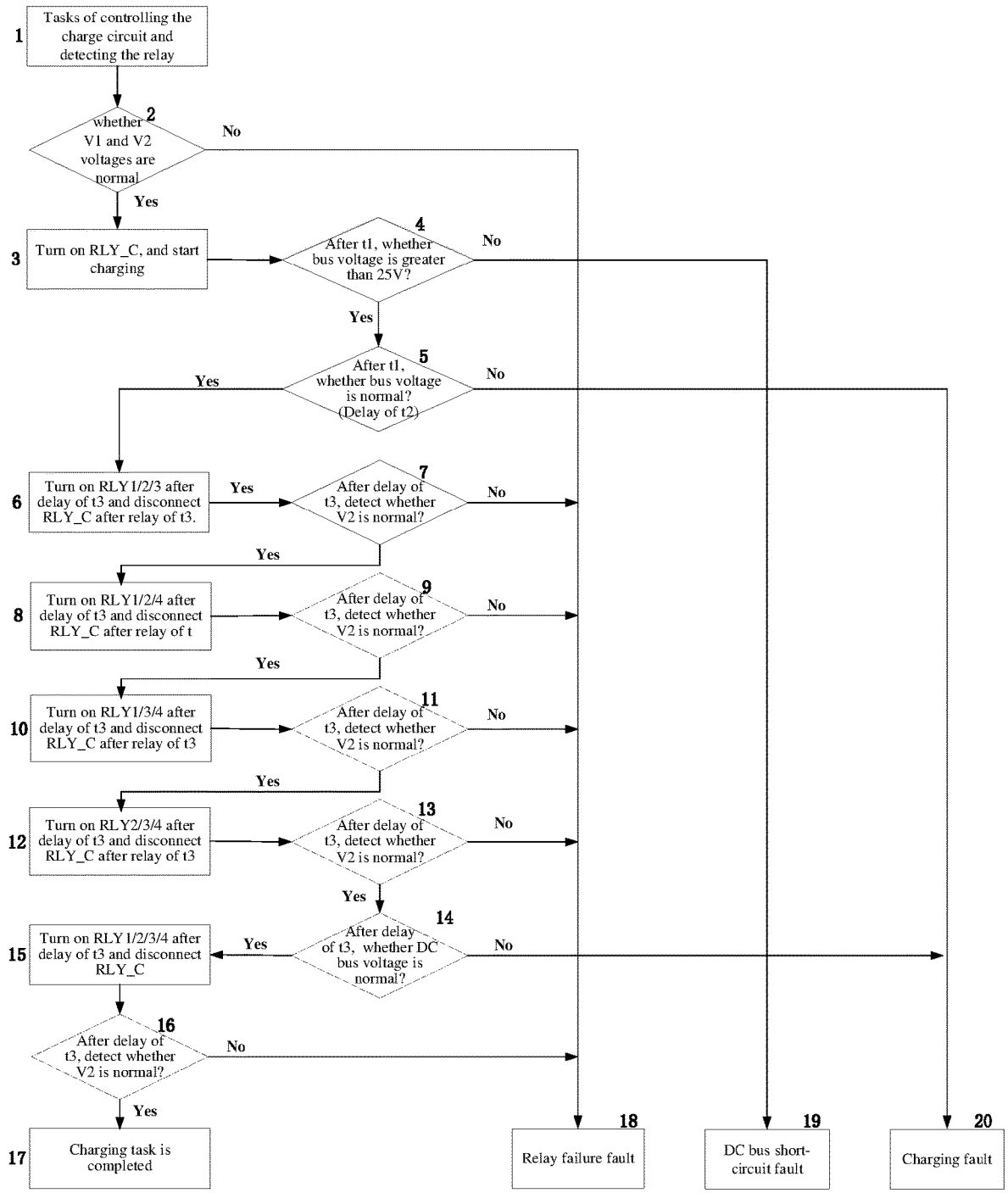
FIG. 7 is a schematic view of still some other embodiments of the charging control method of the present disclosure.

FIG. 7 is a schematic view of still some other embodiments of the charging control method of the present disclosure. Preferably, this embodiment may be performed by the charging control device of the present disclosure or the charging control circuit of the present disclosure.

The charging circuit control of the above-described embodiments of the present disclosure is actually a control process of charging the direct current bus capacitor through a resistor, then turning on the first relay RLY1 to the fourth relay RLY4, and finally bypassing the charging resistor, wherein it is necessary to detect a failure of the first relay RLY1 to the fourth relay RLY4.

In the above-described embodiments of the present disclosure, the first relay RLY1 to the fourth relay RLY4 are present with two failures: open-circuit and short-circuit (adhesion).

The method for controlling the charging circuit and detecting a relay failure in the embodiment of FIG. 7 may comprise step 1 to step 20.

In step 1, tasks are started to control the charging circuit and detect a relay failure.

In step 2, after tasks are started, it is determined whether an effective value of the grid side voltage and an effective value of the machine side voltage satisfy a first condition that the effective value of the grid side voltage V1 is within a first predetermined range and the effective value of the machine side voltage V2 is less than a predetermined value. In the case where the effective value of the grid side voltage and the effective value of the machine side voltage satisfy a first condition, the step 3 is performed; otherwise, in the case where the effective value of the grid side voltage and the effective value of the machine side voltage do not satisfy a first condition, the charging logic control is not performed, and the step 18 is performed, a relay failure is determined and a message of a relay failure is reported to the outside, wherein in this case, the relay failure is that the first relay RLY1 to the fourth relay RLY4 are all short-circuited.

In some embodiments of the present disclosure, the above-described first predetermined range is 10V-280V.

In some embodiments of the present disclosure, the above-described predetermined value is 50V.

In step 3, the charging relay RLY_C is turned on and the charging of the bus capacitor begins.

In some embodiments of the present disclosure, for the charging control circuit of the embodiment in FIG. 2, due to the existence of the charging resistance, since such charging process of the filter capacitor from no charge to first charging (the charging relay is turned on to charge the bus capacitor) is realized by connecting the charging resistance and the charging relay to the power grid such that the charging resistance has a current limiting effect, the above-described embodiments of the present disclosure may suppress the impact on the filter capacitor C. However, the circuit structure of FIG. 3 cannot achieve such suppression effect.

In step 4, within a first predetermined time interval t1 after turning on the charging relay, it is determined whether the direct current bus voltage satisfies a second condition, wherein the second condition is that the direct current bus voltage is greater than a predetermined voltage. Within the first predetermined time interval t1 after turning on the charging relay, if the direct current bus voltage does not satisfy a second condition, the step 19 is performed, that is, short-circuit of the direct current bus is determined, and a message of short-circuit of the direct current bus is reported; otherwise, within a first predetermined time interval t1 after turning on the charging relay, the step 5 is performed in the case where the direct current bus voltage satisfies a second condition.

In some embodiments of the present disclosure, the first predetermined time interval t1 may be equal to twice the predetermined interval t.

In some embodiments of the present disclosure, the selectable range of the predetermined interval t is tmin to tmax, wherein the minimum value tmin depends on the stable time after the relay is actuated, and the maximum value tmax is affected by the heating of the charging resistor.

In some embodiments of the present disclosure, the selectable range of the predetermined interval t is 0.3-1 s.

In some embodiments of the present disclosure, the predetermined interval t may be 0.5 s.

In some embodiments of the present disclosure, the above-described predetermined voltage may be 25V.

In step 5, after the charging relay is turned on for the first predetermined time interval t1, it is determined whether the direct current bus voltage satisfies a third condition, wherein the third condition is that the direct current bus voltage is greater than a predetermined direct current bus threshold. After the charging relay is turned on for the first predetermined time interval t1, if the direct current bus voltage satisfies the third condition, the step 6 is performed; otherwise, after a delay of a second predetermined time interval t2, if the direct current bus voltage still does not satisfy a third condition, the step 20 is performed, that is, a charging circuit fault is determined, and a message of the charging circuit fault is reported to the outside.

In some embodiments of the present disclosure, the second predetermined time interval t2 may be equal to 12 times the predetermined interval t.

In some embodiments of the present disclosure, the above-described predetermined direct current bus threshold may be Vph*1.414*0.8.

In step 6, after delay of the third predetermined time interval t3, any three of the four relays of the dual relay circuit (for example, the first relay RLY1, the second relay RLY2, and the second relay RLY3) are turned on; then after a delay of the third predetermined time interval t3, the charging relay RLY_C is disconnected.

In some embodiments of the present disclosure, the third predetermined time interval t3 may be equal to the predetermined interval t.

In step 7, after delay of the third predetermined time interval t3, it is determined whether the effective value V2 of the machine side voltage satisfies a fourth condition, wherein the fourth condition is that the effective value of the machine side voltage V2 is less than a predetermined value.

If the effective value of the machine side voltage still does not satisfy the fourth condition after delay of the fourth predetermined time interval t4, then the step 18 is performed, that is, a relay failure is determined, and a message of a relay failure is reported to the outside, wherein in this case, the relay failure is that the fourth relay RLY4 not selected among the four relays is short-circuited.

In some embodiments of the present disclosure, the fourth predetermined time interval t4 may be equal to 5 times the predetermined interval t.

Otherwise, in the case where the effective value of the machine side voltage satisfies the fourth condition, the step 8 is performed.

In step 8, after delay of the third predetermined time interval t3, the first relay RLY1 to the fourth relay RLY4 are disconnected, and the charging relay RLY_C is turned on; after delay of the third predetermined time interval t3, the first relay RLY1, the second relay RLY2 and the fourth relay RLY4 are turned on, and after delay of the third predetermined time interval t3, the charging relay RLY_C is disconnected.

In step 9, after delay of the third predetermined time interval t2, it is determined whether the effective value V2 of the machine side voltage satisfies a fourth condition, wherein the fourth condition is that the effective value of the machine side voltage V2 is less than a predetermined value.

If the effective value of the machine side voltage still does not satisfy the fourth condition after delay of the fourth predetermined time interval t4, then the step 18 is performed, that is, a relay failure is determined, and a message of a relay failure is reported to the outside, wherein in this case, the relay failure is that the third relay RLY3 not selected among the four relays is short-circuited.

Otherwise, if the effective value of the machine side voltage satisfies the fourth condition, the step 10 is performed.

In step 10, after delay of the third predetermined time interval t3, the first relay RLY1 to the fourth relay RLY4 are disconnected and the charging relay RLY_C is turned on; after delay of the third predetermined time interval t3, the first relay RLY1 and the third relay RLY3 and the fourth relay RLY4 are turned on, and after delay of the third predetermined time interval t3, the charging relay RLY_C is disconnected.

In step 11, after delay of the third predetermined time interval t3, it is determined whether the effective value V2 of the machine side voltage satisfies the fourth condition, wherein the fourth condition is that the effective value of the machine side voltage V2 is less than a predetermined value.

If the effective value of the machine side voltage still does not satisfy the fourth condition after delay of the fourth predetermined time interval t4, then the step 18 is performed, that is, a relay failure is determined, and a message of a relay failure is reported to the outside, wherein in this case, the relay failure is that the second relay RLY2 not selected among the four relays is short-circuited.

Otherwise, if the effective value of the machine side voltage satisfies the fourth condition, the step 12 is performed.

In step 12, after delay of the third predetermined time interval t3, the first relay RLY1 to the fourth relay RLY4 are disconnected, and the charging relay RLY_C is turned on; after delay of the third predetermined time interval t3, the second relay RLY2 and the third relay RLY3 and the fourth relay RLY4 are turned on, and after delay of the third predetermined time interval t3, the charging relay RLY_C is disconnected.

In step 13, after delay of the third predetermined time interval t3, it is determined whether the effective value V2 of the machine side voltage satisfies the fourth condition, wherein the fourth condition is that the effective value of the machine side voltage V2 is less than a predetermined value.

If the effective value of the machine side voltage still does not satisfy the fourth condition after delay of the fourth predetermined time interval t4, then the step 18 is performed, that is, a relay failure is determined, and a message of a relay failure is reported to the outside, wherein in this case, the relay failure is that the first relay RLY1 not selected among the four relays is short-circuited.

Otherwise, in the case where the effective value of the machine side voltage satisfies the fourth condition, the step 14 is performed.

In the above-described embodiments of the present disclosure, since the filter capacitor has been charged, the charging relay is first turned on and then disconnected, and in the case where the first relay RLY1 to the fourth relay RLY4 are not all turned on, the machine side voltage V2 is actually a direct current amount (randomly, according to a phase of the AC voltage upon disconnection), wherein the value for determination is the effective value of the V2 voltage minus the direct current component.

In step 14, after delay of the third predetermined time interval t3, it is determined whether the direct current bus voltage satisfies a fifth condition, wherein the above-described fifth condition is that the direct current bus voltage continues to be greater than a predetermined direct current bus threshold (Vph*1.414*0.7). In the case where the direct current bus voltage does not satisfy the fifth condition, the step 20 is performed, that is, a charging circuit fault is determined, and a message of a charging circuit fault is reported to the outside. Otherwise, in the case where the direct current bus voltage satisfies the fifth condition, the step 15 is performed.

In step 15, the first relay RLY1 to the fourth relay RLY4 are turned on, and the charging relay RLY_C is turned on.

In some embodiments of the present disclosure, in step 15, although the first relay RLY1 to the fourth relay RLY4 are turned on, and the charging relay is disconnected, if one of the relays is open-circuited, it necessarily results in that V1 and V2 are fully connected, that is, it is measured that the effective value of the V2 voltage is not within a normal range (theoretically, the effective value of the V2 voltage minus an average value should be 0). The above-described embodiments of the present disclosure may detect an open-circuit failure of the first relay RLY1 and the fourth relay RLY4 in the above-described manner.

In step 16, after delay of the third predetermined time interval t3, it is determined whether the effective value of the machine side voltage satisfies a sixth condition, wherein the sixth condition is that the effective value of the machine side voltage is within a second predetermined range (for example, 160-280V). In the case where the effective value of the machine side voltage satisfies the sixth condition, the step 17 is performed; otherwise, in the case where the effective value of the machine side voltage does not satisfy a sixth condition, the step 18 is determined, that is, the relay failure is determined and a message of the relay failure is reported to the outside.

In some embodiments of the present disclosure, the second relay RLY2 and the fourth relay RLY4 are controlled by a chip. Before it is detected whether the V2 voltage is within a second predetermined range (for example, 160-280V), it is possible to check a relay state (SPI) from feedback of the chip, to determine whether the second relay RLY2 and the fourth relay RLY4 are turned on and disconnected according to the requirements. If the requirements are not conformed, a charging circuit fault is reported to the outside.

In step 17, in the case where the effective value of the machine side voltage satisfies the sixth condition, it is determined that the charging control task is completed, and a message that the charging control task is completed is reported to the outside.

In step 18, a relay failure is determined, and a message of a relay failure is reported to the outside.

In step 19, short-circuit of the direct current bus is determined, and a message of short-circuit of the direct current bus is reported to the outside.

In step 20, a charging circuit fault is determined, and a message of a charging circuit fault information is reported to the outside.

In some embodiments of the present disclosure, a charging circuit fault is reported in the steps 5 and 14. The determination is mainly based on whether the bus voltage reaches a predetermined direct current bus threshold (Vph*1.414*0.7), because a charging failure may be caused due to reasons such as short-circuit of the bus, excessive load of the bus and open-circuit failure of a plurality of relays.

In the above-described embodiments of the present disclosure, as long as it is necessary to determine a voltage and state after the relay is actuated, it is preferable to proceeding to the next operation after a delay of the predetermined interval t.

In the above-described embodiments of the present disclosure, a circuit and method for controlling charging and detecting a relay failure of a single-phase photovoltaic electric appliance is provided so that it is possible to realize detection of adhesion and open-circuit of the AC relay and short-circuit of the direct current bus, and impact suppression of the AC filter capacitor (after the charging relay is turned on, the charging of the AC filter capacitor is realized by the current limiting of the charging resistor).

The charging control method of the above-described embodiments of the present disclosure (for example, any of the embodiments of FIGS. 5 to 6) may be implemented by the charging control circuit of the embodiment of FIG. 2.

The charging control method of the above-described embodiments of the present disclosure (for example, any of the embodiments of FIGS. 5 to 6) may be implemented by the charging control circuit of the embodiment of FIG. 3 except for the step of suppressing the impact on the filter capacitor. In addition, compared with the embodiment of FIG. 2, the charging control circuit of the embodiment of FIG. 3 also simplifies the calculation of the effective value of the V2 voltage (there is no need to subtract an average value from V2).

The above-described embodiments of the present disclosure may implement a charging and relay detection circuit applied to a photovoltaic electric appliance (a device integrating power generation and power consumption), such that the requirement of detection of a single relay in the certification is achieved on the basis of this circuit.

The above-described embodiments of the present disclosure may satisfy the requirement of detecting a relay failure of relevant photovoltaic standards, and avoid the impact on the filter capacitor.

The charging circuit control of the above-described embodiments of the present disclosure is actually a control process of charging the direct current bus capacitor through a resistor, then turning on the first relay RLY1 to the fourth relay RLY4, and finally bypassing charging resistor, wherein it is necessary to detect a failure of the first relay RLY1 to the fourth relay RLY4.

Figure 8:
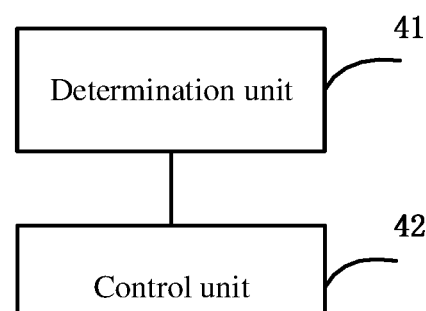
FIG. 8 is a schematic view of some embodiments of the charging control device of the present disclosure.

FIG. 8 is a schematic view of some embodiments of the charging control device of the present disclosure. As shown in FIG. 8, the charging control device of the above-described embodiments of the present disclosure (for example, the charging control device 4 of the embodiment of FIG. 4) may comprise a determination unit 41 and a control unit 42.

The determination unit 41 is configured to determine whether the dual relay circuit in the charging control circuit described in any one of the above-described embodiments is turned on.

The control unit 42 is configured to turn on the charging relay circuit to realize gradual charging of the bus capacitor in the case where the dual relay circuit is not turned on.

In some embodiments of the present disclosure, the above-described charging control device 4 is configured to perform operations for implementing the above-described charging control method in any one of the above-described embodiments (for example, any of the embodiments in FIGS. 5 to 7).

Based on the charging control device provided by the above-described embodiments of the present disclosure, a charging circuit is added on the AC power supply side so that it is possible to realize the charging control of the bus capacitor. In the above-described embodiments of the present disclosure, the AC side charging relay (RLY_C) and the charging resistance are connected across both ends of the dual relay. In the case where the dual relay is not turned on, the charging relay may be turned on to achieve gradual charging of the bus capacitance.

Figure 9:
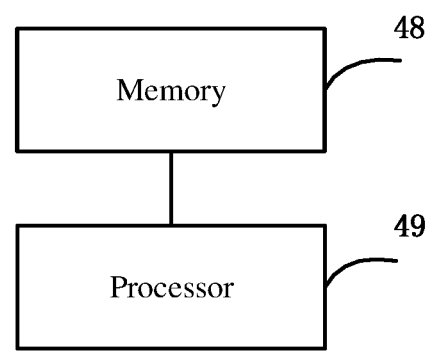
FIG. 9 is a schematic view of some other embodiments of the charging control device of the present disclosure.

FIG. 9 is a schematic view of some other embodiments of the charging control device of the present disclosure. As shown in FIG. 9, the charging control device of the above-described embodiments of the present disclosure (for example, the charging control device 4 of the embodiment of FIG. 4) may comprise a memory 48 and a processor 49.

The memory 48 is configured to store instructions.

The processor 49 is configured to execute the above-described instructions, so that the above-described charging control device 4 performs operations for implementing the above-described charging control method in any one of the above-described embodiments (for example, any one of the above-described embodiments of FIGS. 5 to 7).

The above-described embodiments of the present disclosure may achieve the effects such as detection of adhesion and open-circuit of the AC relay and short-circuit of the direct current bus, and suppression of the impact on the AC filter capacitor.

The above-described embodiments of the present disclosure may implement a charging and relay detection circuit applied to a photovoltaic electric appliance (a device integrating power generation and power consumption), such that the requirement of detection of a single relay in the certification is achieved on the basis of this circuit.

The charging circuit control of the above-described embodiments of the present disclosure is actually a control process of charging the direct current bus capacitor through a resistor, then turning on the first relay RLY1 to the fourth relay RLY4, and finally bypassing charging resistor, wherein it is necessary to detect a failure of the first relay RLY1 to the fourth relay RLY4.

According to another aspect of the present disclosure, a photovoltaic electric appliance is provided. The device comprises the charging control circuit described in any one of the above-described embodiments, and/or comprises the charging control device 4 described in any one of the above-described embodiments.

In some embodiments of the present disclosure, the above-described photovoltaic electrical device may be a photovoltaic air conditioner.

Based on the photovoltaic electric appliance provided by the above-described embodiments of the present disclosure, a charging circuit is added on the AC power supply side, so that the charging relay may be turned on to achieve gradual charging of the bus capacitance in the case where the dual relay is not turned on.

The above-described embodiments of the present disclosure may achieve the effects such as detection of adhesion and open-circuit of the AC relay and short-circuit of the direct current bus, and suppression of the impact on the AC filter capacitor.

The above-described embodiments of the present disclosure may implement a charging and relay detection circuit applied to a photovoltaic electric appliance (integrated power generation and utilization device), and the requirement for detection of a single relay in the certification is realized on the basis of this circuit.

The charging circuit control of the above-described embodiments of the present disclosure is actually a control process of charging the direct current bus capacitor through a resistor, then turning on the first relay RLY1 to the fourth relay RLY4, and finally bypassing charging resistor, wherein it is necessary to detect a failure of the first relay RLY1 to the fourth relay RLY4.

According to another aspect of the present disclosure, a computer-readable storage medium is provided. The above-described computer-readable storage medium stores computer instructions, wherein the above-described charging control method in any one of the above-described embodiments is implemented when the above-described instructions are executed.

Based on the computer-readable storage medium provided by the above-described embodiments of the present disclosure, a charging circuit is added on the AC power supply side, so that the charging relay may be turned on to achieve gradual charging of the bus capacitance in the case where the dual relay is not turned on.

The above-described embodiments of the present disclosure may achieve the effects such as detection of adhesion and open-circuit of the AC relay and short-circuit of the direct current bus, and suppression of the impact on the AC filter capacitor.

The above-described embodiments of the present disclosure may implement a charging and relay detection circuit applied to a photovoltaic electric appliance (integrated power generation and utilization device), and the requirement for detection of a single relay in the certification is realized on the basis of this circuit.

The charging circuit control of the above-described embodiments of the present disclosure is actually a control process of charging the direct current bus capacitor through a resistor, then turning on the first relay RLY1 to the fourth relay RLY4, and finally bypassing charging resistor, wherein it is necessary to detect a failure of the first relay RLY1 to the fourth relay RLY4.

Heretofore, the present disclosure has been described in detail. Some details well known in the art are not described to avoid obscuring the concept of the present disclosure.

According to the above description, those skilled in the art would fully know how to implement the technical solutions disclosed herein.

Those of ordinary skill in the art may understand that all or some of the steps in the above-described embodiments may be implemented by hardware, or by hardware related to program instructions. The above-described programs may be stored in a computer-readable storage medium. The storage above-described medium as mentioned may be read-only memory, magnetic disk or optical disk, and the like.

Descriptions of the present disclosure, which are made for purpose of illustration and depiction, are not absent with omissions or limiting the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and comprising various modifications.

What is claimed is:

1. A charging control circuit, comprising:
    a dual relay circuit arranged between a grid side circuit and a machine side circuit of a photovoltaic electric appliance;
    a charging relay circuit configured to be turned on to realize gradual charging of a bus capacitance in a case where the dual relay circuit is not turned on;
    a first voltage detection device configured to detect a grid side voltage at a connection point between the grid side circuit and the dual relay circuit of the photovoltaic electric appliance;
    a second voltage detection device configured to detect a machine side voltage at a connection point between the machine side circuit and the dual relay circuit of the photovoltaic electric appliance; and
    a charging control device configured to perform at least one of the following steps;
    controlling an on state and an off state of the charging relay circuit and the dual relay circuit according to the grid side voltage and the machine side voltage; and
    determining a circuit failure type according to the grid side voltage and the machine side voltage.

2. The charging control circuit according to claim 1, wherein the charging relay circuit comprises a charging relay and a charging resistor.

3. The charging control circuit according to claim 1, wherein:
    the charging relay circuit is connected across a first end and a second end of the dual relay circuit; or
    a first end of the charging relay circuit is connected to a connection point between the grid side circuit and the dual relay circuit, and a second end of the charging relay circuit is connected to a direct current bus.

4. The charging control circuit according to claim 1, wherein the dual relay circuit comprises:
    a first relay and a second relay connected in series to a neutral wire; and
    a third relay and a fourth relay connected in series to a live wire.

5. The charging control circuit according to claim 4, wherein the first relay, the second relay, the third relay, and the fourth relay are four separate alternating current relays, and the dual relay circuit comprises:
    a first group of dual switch relays comprising the first relay and the third relay; and
    a second group of dual switch relays comprising the second relay and the fourth relay.

6. The charging control circuit according to claim 1, further comprising:
    a third voltage detection device configured to detect a direct current bus voltage, wherein the charging control device is configured to perform at least one of the following steps:
    controlling the on state and the off state of the charging relay circuit and the dual relay circuit according to the direct current bus voltage, the grid side voltage, and the machine side voltage; and
    determining a circuit fault type according to the direct current bus voltage, the grid side voltage, and the machine side voltage.

7. A charging control method, comprising:
    determining whether a dual relay circuit in a charging control circuit is turned on, wherein the charging control circuit is arranged between a grid side circuit and a machine side circuit of the photovoltaic electric appliance; and
    turning on the charging relay circuit to realize gradual charging of the bus capacitor in the case where the dual relay circuit is not turned on;
    wherein the charging control method further comprises:
        obtaining a grid side voltage and a machine side voltage;
        controlling an on state and an off state of the charging relay circuit and the dual relay circuit according to the grid side voltage and the machine side voltage;
        obtaining the grid side voltage and the machine side voltage; and
        determining a circuit fault type according to the grid side voltage and the machine side voltage; or
        obtaining a grid side voltage and a machine side voltage; and
        controlling the on state and the off state of the charging relay circuit and the dual relay circuit according to the grid side voltage and the machine side voltage and determining a circuit fault type according to the grid side voltage and the machine side voltage.

8. The charging control method according to claim 7, wherein controlling the on state and the off state of the charging relay circuit and the dual relay circuit according to the grid side voltage and the machine side voltage comprises:
    obtaining a direct current bus voltage;
    controlling the on state and the off state of the charging relay circuit and the dual relay circuit according to a direct current bus voltage, the grid side voltage, and the machine side voltage;
    obtaining the direct current bus voltage; and
    determining the circuit fault type according to the direct current bus voltage, the grid side voltage, and the machine side voltage; or
    obtaining a direct current bus voltage; and
    controlling the on state and the off state of the charging relay circuit and the dual relay circuit according to the direct current bus voltage, the grid side voltage, and the machine side voltage, and determining a circuit fault type according to the direct current bus voltage, the grid side voltage, and the machine side voltage.

9. The charging control method according to claim 7, wherein the charging relay circuit comprises a charging relay, the method further comprising:
    controlling the on state and the off state of the charging relay circuit and the dual relay circuit according to a direct current bus voltage, the grid side voltage, and the machine side voltage, and determining the circuit fault type according to the direct current bus voltage, the grid side voltage, and the machine side voltage;

wherein controlling the on state and the off state of the charging relay circuit and the dual relay circuit according to the direct current bus voltage, the grid side voltage, and the machine side voltage, and determining the circuit fault type according to the direct current bus voltage, the grid side voltage, and the machine side voltage comprises:

determining whether an effective value of the grid side voltage and an effective value of the machine side voltage satisfy a first condition that the effective value of the grid side voltage is within a first predetermined range, and the effective value of the machine side voltage is less than a predetermined value;

turning on the charging relay in a case where the effective value of the grid side voltage and the effective value of the machine side voltage satisfy the first condition; and determining a relay failure, and reporting a message of the relay failure to the outside in a case that the effective value of the grid side voltage and the effective value of the machine side voltage do not satisfy a first condition, wherein the relay failure is that a first relay, a second relay, a third relay, and a fourth relay of the dual relay circuit are all short-circuited.

10. The charging control method according to claim 9, wherein determining the circuit fault type according to the direct current bus voltage, the grid side voltage, and the machine side voltage further comprises:

determining whether the direct current bus voltage satisfies a second condition within a first predetermined time interval after turning on the charging relay, wherein the second condition is that the direct current bus voltage is greater than a predetermined voltage; and determining that the direct current bus is short-circuited, and reporting a message of short-circuit of the direct current bus to the outside in a case where the direct current bus voltage does not satisfy the second condition within the first predetermined time interval after turning on the charging relay.

11. The charging control method according to claim 10, wherein determining the circuit fault type according to the direct current bus voltage, the grid side voltage, and the machine side voltage further comprises:

determining whether the direct current bus voltage satisfies a third condition after turning on the charging relay for the first predetermined time interval in a case where the direct current bus voltage satisfies a second condition within the first predetermined time interval after turning on the charging relay, wherein the third condition is that the direct current bus voltage is greater than a predetermined direct current bus threshold; and determining a charging circuit fault and reporting a message of the charging circuit fault to the outside in a case where the direct current bus voltage still does not satisfy a third condition after a second predetermined time interval.

12. The charging control method according to claim 11, wherein controlling the on state and the off state of the charging relay circuit and the dual relay circuit according to the direct current bus voltage, the grid side voltage, and the machine side voltage, and determining a circuit fault type according to the direct current bus voltage, the grid side voltage, and the machine side voltage further comprises:

turning on any three of a first relay, a second relay, a third relay, and a fourth relay of the dual relay circuit after a delay of a third predetermined time interval in the case where the direct current bus voltage satisfies the third condition after the charging relay is turned on for the first predetermined time interval;

disconnecting the charging relay after the delay of the third predetermined time interval;

determining whether the effective value of the machine side voltage satisfies a fourth condition after the delay of the third predetermined time interval, wherein the fourth condition is that an effective value of the machine side voltage is less than a predetermined value; and determining a relay failure, and reporting a message of the relay failure to the outside if an effective value of the machine side voltage still does not satisfy the fourth condition after a delay of a fourth predetermined time interval, wherein the relay failure is that a relay not selected among a group comprising the first relay, the second relay, the third relay, and the fourth relay is short-circuited.

13. The charging control method according to claim 12, wherein controlling the on state and the off state of the charging relay circuit and the dual relay circuit according to the direct current bus voltage, the grid side voltage, and the machine side voltage, and determining a circuit fault type according to the direct current bus voltage, the grid side voltage, and the machine side voltage further comprises:

disconnecting the first relay, the second relay, the third relay, and the fourth relay, and turning on the charging relay after the delay of the third predetermined time interval in a case that an effective value of the machine side voltage satisfies the fourth condition;

determining whether the direct current bus voltage satisfies a fifth condition after the delay of the third predetermined time interval, wherein the fifth condition is that the direct current bus voltage continues to be greater than the predetermined direct current bus threshold; and determining a charging circuit fault, and reporting a message of the charging circuit fault to the outside in the case that the direct current bus voltage does not satisfy the fifth condition.

14. The charging control method according to claim 13, wherein controlling the on state and the off state of the charging relay circuit and the dual relay circuit according to the direct current bus voltage, the grid side voltage, and the machine side voltage, and determining a circuit fault type according to the direct current bus voltage, the grid side voltage, and the machine side voltage further comprises:

turning on the first relay, the second relay, the third relay, and the fourth relay and turning on the charging relay in a case where the direct current bus voltage satisfies the fifth condition;

determining whether an effective value of the machine side voltage satisfies a sixth condition after delay of the third predetermined time interval, wherein the sixth condition is that an effective value of the machine side voltage is within a second predetermined range;

determining that a charging control task is completed, and reporting a message that the charging control task is completed to the outside in a case that an effective value of the machine side voltage satisfies the sixth condition; and determining that the relay fails, and reporting a message that the relay fails to the outside in the case that an effective value of the machine side voltage does not satisfy the sixth condition.

15. A charging control device, comprising:
a memory configured to store instructions; and
a processor configured to execute the instructions, so that the charging control device performs operations for implementing the charging control method according to claim 7.

16. A computer-readable storage medium, wherein the computer-readable storage medium stores a plurality of computer instructions, and the charging control method according to claim 7 is implemented when the plurality of computer instructions are executed by a processor.

17. A photovoltaic electric appliance comprising a charge control circuit, wherein the charging control circuit comprises a dual relay circuit arranged between a grid side circuit and a machine side circuit of a photovoltaic electric appliance; a charging relay circuit configured to be turned on to realize gradual charging of a bus capacitance in the case where the dual relay circuit is not turned on; a first voltage detection device configured to detect a grid side voltage at a connection point between the grid side circuit and the dual relay circuit of the photovoltaic electric appliance; a second voltage detection device configured to detect a machine side voltage at a connection point between the machine side circuit and the dual relay circuit of the photovoltaic electric appliance; and a charging control device configured to perform at least one of the following steps: controlling on and off of the charging relay circuit and the dual relay circuit according to the grid side voltage and the machine side voltage; and determining a circuit failure type according to the grid side voltage and the machine side voltage.

* * * * *